United States Patent
Chaudhary et al.

(10) Patent No.: US 8,283,420 B2
(45) Date of Patent: Oct. 9, 2012

(54) CROSSLINKABLE POLYETHYLENE COMPOSITION, METHOD OF MAKING THE SAME, AND ARTICLES MADE THEREFROM

(75) Inventors: Bharat I. Chaudhary, Princeton, NJ (US); John Klier, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 253 days.

(21) Appl. No.: 12/525,688

(22) PCT Filed: Jan. 25, 2008

(86) PCT No.: PCT/US2008/051991
§ 371 (c)(1),
(2), (4) Date: Aug. 4, 2009

(87) PCT Pub. No.: WO2008/097732
PCT Pub. Date: Aug. 14, 2008

(65) Prior Publication Data
US 2010/0016515 A1 Jan. 21, 2010

Related U.S. Application Data

(60) Provisional application No. 60/899,485, filed on Feb. 5, 2007.

(51) Int. Cl.
C08F 279/00 (2006.01)
C08F 255/00 (2006.01)
C08L 23/04 (2006.01)
C08K 5/14 (2006.01)

(52) U.S. Cl. ......... 525/313; 525/242; 525/244; 525/263

(58) Field of Classification Search .................. 524/481, 524/483, 848, 586, 587; 525/50, 55, 242, 525/313, 319, 320, 375, 387, 263
See application file for complete search history.

(56) References Cited

U.S. PATENT DOCUMENTS

| | | | |
|---|---|---|---|
| 4,798,081 A | 1/1989 | Hazlitt et al. | |
| 5,869,580 A | 2/1999 | Novits et al. | |
| 6,103,807 A | 8/2000 | Carter et al. | |
| 6,143,822 A | 11/2000 | Caronia et al. | |
| 6,187,847 B1 | 2/2001 | Cogen et al. | |
| 6,228,917 B1 | 5/2001 | Keogh | |
| 6,656,986 B2 | 12/2003 | Caronia et al. | |
| 7,608,668 B2 | 10/2009 | Li Pi Shan et al. | |
| 2004/0198920 A1* | 10/2004 | Debaud et al. | 525/375 |
| 2008/0051496 A1* | 2/2008 | Debaud et al. | 524/236 |
| 2008/0085973 A1* | 4/2008 | Esseghir et al. | 524/718 |

FOREIGN PATENT DOCUMENTS

| | | | |
|---|---|---|---|
| EP | 0943650 A1 | * | 9/1999 |
| EP | 1 041 583 A1 | | 10/2000 |
| WO | WO 0228946 A1 | * | 4/2002 |
| WO | WO 2006032765 A1 | * | 3/2006 |

OTHER PUBLICATIONS

International Search Report (PCT/US2008/051991).
Gachter, et al., Important characteristic values of peroxides, Plastic Additives Handbook, 1985, pp. 646-649.
Stille, J.K., Vinyl Addition Polymers, Introduction to Polymer Chemistry, 1962, pp. 149-151, John Wiley and Sons, Inc., New York.
Williams, T., et al., The Construction of a Polyethylene Calibration Curve for Gel Permeation Chromatography Using Polystyrene Fractions, Journal of Polymer Science: Polymer Letters, 1968, pp. 621-624, vol. 6, H.H. Wills Physics Laboratory, England.
Randall, James, C., A Review of High Resolution Liquid $^{13}$Carbon Nuclear Magnetic Resonance Characterizations of Ethylene-Based Polymers, JMS-REV. Macromol. Chem. Phys., 1989, pp. 201-317, C29(2&3), Baytown Polymers Center, Baytown, Texas.
Wild, L., et al., Determination of Branching Distributions in Polyethylene and Ethylene Copolymers. Journal of Polymer Science: Polymer Physics Edition, 1982, pp. 441-455, vol. 20, John Wiley & Sons, Inc.
Gustafsson, B., Stabilization of Peroxide Crosslinked Polyethylene, Die Angewandte Makromolekulare Chemie, 1998, pp. 93-99, vol. 261/262.
Palmlof, M., et al., Crosslinking of poly(ethylene-co-1,9-decadiene) by electron beam irradiation, Polymer, 2000, pp. 6481-6495, vol. 41, Elsevier Science.
Palmlof, M., et al., Chemical and mechanical changes in poly(ehtylene-co-1,9-decadiene) following crosslinking induced by peroxides, Polymer, 2000, pp. 6497-6505, vol. 41, Elsevier Science.
Yamazaki, T., et al., Electron Spin Resonance Study on Chemical-Crosslinking Reaction Mechanisms of Polyethylene Using a Chemical Agent. VI. Effect of α-Methyl Styrene Dimer, Journal of Polymer Science: Part A: Polymer Chemistry, 2001, pp. 2151-2156, vol. 39, John Wiley & Sons, Inc.

* cited by examiner

*Primary Examiner* — Irina S Zemel
*Assistant Examiner* — Jeffrey Lenihan

(57) ABSTRACT

The instant invention is a crosslinkable polyethylene composition obtained via a process comprising the steps of (1) providing a polyethylene component; (2) providing an organic peroxide crosslinking agent,(3) providing a crosslinking coagent which comprises at least two terminal carbon-carbon double bonds and is an alkadiene, alkatriene, or alkatetraene compound; (4) melt blending the polyethylene component, the crosslinking agent, and the crosslinking coagent at a temperature less than the decomposition temperature of the crosslinking agent; and (5) thereby forming the crosslinkable polyethylene composition. The crosslinkable polyethylene composition may further include a scorch inhibitor, a cure booster, a stable free radical, one or more conventional additives, and/or combinations thereof. The instant invention further includes articles comprising the crosslinked product of the crosslinkable polyethylene composition.

3 Claims, No Drawings

CROSSLINKABLE POLYETHYLENE COMPOSITION, METHOD OF MAKING THE SAME, AND ARTICLES MADE THEREFROM

CROSS-REFERENCE TO RELATED APPLICATIONS

This application is a non-provisional application claiming priority from the U.S. Provisional Patent Application No. 60/899,485, filed on Feb. 5, 2007 entitled "CROSSLINKABLE POLYETHYLENE COMPOSITION, METHOD OF MAKING THE SAME, AND ARTICLES MADE THEREFROM" the teachings of which are incorporated by reference herein as if reproduced in full hereinbelow.

FIELD OF INVENTION

The instant invention relates to a crosslinkable polyethylene composition, method of making the same, and articles made therefrom.

BACKGROUND OF THE INVENTION

The use of crosslinkable polymeric compositions to fabricate articles such as cables, pipes, footwear, and foams is generally well known. Crosslinkable polymeric composition generally include a polymer, a crosslinking agent such as organic peroxides, antioxidants, and optionally, various other additives such as a scorch inhibitor and a crosslinking booster. Crosslinking assists the polymer in meeting mechanical and physical requirements such as improved high temperature properties.

The crosslinking of polymers with free radical initiators such as organic peroxides is also generally well known. Generally, the organic peroxide is incorporated into the polymer by melt blending in a roll mill, a biaxial screw kneading extruder, or a Banbury™ or Barbender™ mixer at a temperature lower than the onset temperature for significant decomposition of the peroxide. Peroxides are judged for decomposition based on their half-life temperatures as described in Plastic Additives Handbook, Gachter et al, 1985, pages 646 to 649.

An alternative method for organic peroxide incorporation into a polymeric compound is to mix liquid peroxide and pellets of the polymer in a blending device, such as a Henschel™ mixer or a soaking device such as a simple drum tumbler, which are maintained at temperatures above the freeze point of the organic peroxide and below the decomposition temperature of the organic peroxide and the melt temperature of the polymer. Following the organic peroxide incorporation, the polymer/organic peroxide blend is then, for example, introduced into an extruder where it is extruded around an electrical conductor at a temperature lower than the decomposition temperature of the organic peroxide to form a cable. The cable is then exposed to higher temperatures at which the organic peroxide decomposes to provide free radicals, which crosslink the polymer.

Polymers containing peroxides are vulnerable to scorch (premature crosslinking occurring during the extrusion process). Scorch causes the formation of discolored gel-like particles in the resin and leads to undesired build up of extruder pressure during extrusion. Further, to achieve a high crosslink density, high levels of organic peroxide have often been used. However, high levels of organic peroxide leads to a problem known as sweat-out, which has a negative effect on the extrusion process and the final product. Sweat-out dust is a potential explosion hazard, may foul filters, and can cause slippage and instability in the extrusion process. Therefore, it is desired to reduce the amount of organic peroxide while maintaining a high crosslink density.

U.S. Pat. No. 6,143,822 discloses a polyethylene crosslinkable composition comprising (a) polyethylene; (b) 1,1-diphenylethylene, substituted or unsubstituted, as a scorch inhibitor; (c) optionally, a cure booster; and (d) an organic peroxide.

U.S. Pat. No. 6,187,847 discloses a polyethylene crosslinkable composition comprising (a) polyethylene; (b) [1,3,5-tris (4-tert-butyl-3-hydroxy-2,6-dimethylbenzyl)-1,3,5-triazine-2,4,6-(1H,3H,5H)-trione], as a scorch inhibitor; and (c) an organic peroxide.

U.S. Pat. No. 6,228,917 discloses a polyethylene crosslinkable composition comprising (a) polyethylene; (b) 4,4'-thiobis(2-methyl-6-t-butylphenol); 2,2'-thiobis(6-t-butyl-4-methyphenol); or mixture thereof, as the scorch inhibitor; (c) optionally, a cure booster; and (d) an organic peroxide.

U.S. Pat. No. 6,656,986 discloses a polyethylene crosslinkable composition comprising (a) polyethylene; (b) [1,3,5-tris (4-tert-butyl-3-hydroxy-2,6-dimethylbenzyl)-1,3,5-triazine-2,4,6-(1H,3H,5H)-trione], as a scorch inhibitor; (c) a thioester; (d) a hindered amine stabilizer; and (e) an organic peroxide.

Despite the research efforts in developing crosslinkable polyethylene compositions, there is still a need for improved crosslinkable polyethylene compositions, which can be extruded at high temperatures and high rate with minimum scorch and yet be crosslinked at a fast cure rate to a high crosslink density without sacrificing long-term heat aging stability. Furthermore, there is still a need for a method of making such improved crosslinkable polyethylene compositions.

SUMMARY OF THE INVENTION

The instant invention is a crosslinkable polyethylene composition, a method of making the same, and articles made therefrom. The crosslinkable polyethylene composition according to instant invention includes a polyethylene component, a crosslinking agent, and a crosslinking coagent. The crosslinking agent is an organic peroxide, and the crosslinking coagent is an alkadiene, alkatriene, or alkatetraene compound comprising at least two terminal carbon-carbon double bonds. The crosslinkable polyethylene composition may, optionally, further include a scorch inhibitor, a cure booster, a stable free radical, one or more conventional additives, blends thereof, and/or combinations thereof. The method for producing a crosslinkable polyethylene composition according to instant invention includes the steps of: (1) providing a polyethylene component; (2) providing a crosslinking agent, wherein the crosslinking agent is an organic peroxide; (3) providing a crosslinking coagent, wherein the crosslinking coagent is an alkadiene, alkatriene, or alkatetraene compound comprising at least two terminal carbon-carbon double bonds; (4) melt blending the a polyethylene component, the crosslinking agent, and the crosslinking coagent at a temperature in the range of less than the decomposition temperature of the crosslinking agent; and (5) thereby forming the crosslinkable polyethylene composition. The article according to instant invention includes the crosslinked product of a polyethylene component; a crosslinking agent, wherein the crosslinking agent is an organic peroxide; and a crosslinking coagent, wherein the crosslinking coagent is an alkadiene, alkatriene, or alkatetraene compound comprising at least two terminal carbon-carbon double bonds.

DETAILED DESCRIPTION OF THE INVENTION

The instant invention is a crosslinkable polyethylene composition, a method of making the same, and articles made therefrom.

The crosslinkable polyethylene composition according to instant invention includes a polyethylene component, a crosslinking agent, and a crosslinking coagent. The crosslinkable polyethylene composition may, optionally, further include a scorch inhibitor, a cure booster, a stable free radical, one or more conventional additives, blends thereof, and/or combinations thereof.

The term "polyethylene," as used herein, refers to a homopolymer of ethylene or a copolymer of ethylene and a minor proportion of one or more alpha-olefin comonomers having no more than 20 carbon atoms, and optionally, a diene, or a mixture or blend of such homopolymers and copolymers. The mixture can be a mechanical blend or an in situ blend. The alpha-olefin comonomers may have less than 20 carbon atoms; for example, they may have 3 to 12 carbon atoms; or in the alternative, they may have 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The polyethylene component can also be a copolymer of ethylene and an unsaturated ester such as a vinyl ester, e.g., vinyl acetate or an acrylic or methacrylic acid ester.

The polyethylene component can be homogeneous or heterogeneous. The homogeneous polyethylenes usually have a polydispersity ($M_w/M_n$) in the range of about 1.5 to about 3.5 and an essentially uniform comonomer distribution, and are characterized by single and relatively low DSC melting points. The heterogeneous polyethylenes, on the other hand, have a polydispersity (Mw/Mn) greater than 3.5 and do not have a uniform comonomer distribution. $M_w$, as used herein, refers to weight average molecular weight and $M_n$, as used herein, refers to number average molecular weight. The polyethylene component may have a density in the range of 0.855 to 0.950 $g/cm^3$. All individual values and subranges from 0.855 to 0.950 $g/cm^3$ are included herein and disclosed herein; for example, the polyethylene component may have a density in the range of 0.870 to 0.940 $g/cm^3$; or in the alternative, the polyethylene component may have a density in the range of 0.875 to 0.940 $g/cm^3$. The polyethylene component may further have a melt index ($I_2$), for example, in the range of 0.1 to 3500 g/10 minutes. All individual values and subranges from 0.1 to 3500 g/10 minutes are included herein and disclosed herein; for example, the polyethylene component may have a melt index ($I_2$) in the range of 0.5 to 1000 g/10 minutes, or in the alternative, the polyethylene component may have a melt index ($I_2$) in the range of 0.7 to 1000 g/10 minutes. The polyethylene component may include any amount of one or more alpha-olefin copolymers; for example, the polyethylene component may comprise less than 49 percent by weight of one or more alpha-olefin comonomers, based on the weight of the polyethylene component. All individual values and subranges less than 49 weight percent are included herein and disclosed herein; for example the polyethylene component may comprise less than 10 percent by weight of one or more alpha-olefin comonomers, based on the weight of the polyethylene component; or in the alternative, the polyethylene component may comprise less than 5 percent by weight of one or more alpha-olefin comonomers, based on the weight of the polyethylene component. The polyethylene component may include any amount of ethylene; for example, the polyethylene component may comprise at least about 51 percent by weight of ethylene, based on the weight of the polyethylene component. All individual values and subranges above 51 weight percent are included herein and disclosed herein; for example, the polyethylene component may comprise at least about 90 percent by weight of ethylene, based on the weight of the polyethylene component; or in the alternative, the polyethylene component may comprise at least about 95 percent by weight of ethylene, based on the weight of the polyethylene component. The crosslinkable polyethylene composition may, for example, comprise at least 85 percent by weight of the polyethylene component, based on the total weight of the crosslinkable polyethylene composition. All individual values and subranges above 85 weight percent are included herein and disclosed herein; for example, the crosslinkable polyethylene composition may comprise at least about 90 percent by weight of the polyethylene component, based on the weight of the crosslinkable polyethylene composition; in the alternative, the crosslinkable polyethylene composition may comprise at least about 95 percent by weight of the polyethylene component, based on the weight of the crosslinkable polyethylene composition.

The polyethylene component may be produced via any processes, e.g. low pressure process or high pressure process. The polyethylene component may be produced in the gas phase; or in the alternative, the polyethylene component may be produced in the liquid phase in solutions or slurries by conventional techniques. Low pressure processes are typically run at pressures below 1000 psi whereas high pressure processes are typically run at pressures above 15,000 psi.

Typical catalyst systems, which can be used to prepare these polyethylenes, are magnesium/titanium based catalyst systems, which can be exemplified by the catalyst system described in U.S. Pat. No. 4,302,565 (heterogeneous polyethylenes); vanadium based catalyst systems such as those described in U.S. Pat. Nos. 4,508,842 (heterogeneous polyethylenes) and 5,332,793; 5,342,907; and 5,410,003 (homogeneous polyethylenes); a chromium based catalyst system such as that described in U.S. Pat. No. 4,101,445; a metallocene catalyst system such as those described in U.S. Pat. Nos. 4,937,299, 5,272,236, 5,278,272, and 5,317,036 (homogeneous polyethylenes); or other transition metal catalyst systems. Many of these catalyst systems are often referred to as Ziegler-Natta catalyst systems or Phillips catalyst systems. Catalyst systems, which use chromium or molybdenum oxides on silica-alumina supports, can be included here. Typical processes for preparing the polyethylenes are also described in the aforementioned patents. Typical in situ polyethylene blends and processes and catalyst systems for providing same are described in U.S. Pat. Nos. 5,371,145 and 5,405,901. The various polyethylenes can include low density homopolymers of ethylene made by high pressure processes (HP-LDPEs), linear low density polyethylenes (LLDPEs), very low density polyethylenes (VLDPEs), medium density polyethylenes (MDPEs), high density polyethylene (HDPE) having a density greater than 0.940 $g/cm^3$ and metallocene copolymers with densities less ranging from 0.860 to 0.950 $g/cm^3$. The latter five polyethylenes are generally made by low pressure processes. A conventional high pressure process is described in Introduction to Polymer Chemistry, Stille, Wiley and Sons, New York, 1962, pages 149 to 151. The high pressure processes are typically free radical initiated polymerizations conducted in a tubular reactor or a stirred autoclave. In the stirred autoclave, the pressure is in the range of about 10,000 to 30,000 psi and the temperature is in the range of about 175 to about 250° C., and in the tubular reactor, the pressure is in the range of about 25,000 to about 45,000 psi and the temperature is in the range of about 200 to about 350° C.

Copolymers comprised of ethylene and unsaturated esters are well known, and can be prepared by the conventional high pressure techniques described above. The unsaturated esters can be alkyl acrylates, alkyl methacrylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms. The portion of the copolymer attributed to the ester comonomer can be in the range of about 5 to about 50 percent by weight based on the weight of the copolymer, and is preferably in the range of about 15 to about 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. The melt index of the ethylene/unsaturated ester copolymers can be in the range of about 0.5 to about 50 g/10 minutes, and is preferably in the range of about 2 to about 25 g/10 minutes. One process for the preparation of a copolymer of ethylene and an unsaturated ester is described in U.S. Pat. No. 3,334,081.

The VLDPE can be a copolymer of ethylene and one or more alpha-olefins having 3 to 12 carbon atoms and preferably 3 to 8 carbon atoms. The density of the VLDPE can be in the range of 0.870 to 0.915 g/cm$^3$. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. Catalysts and processes for making the VLDPE are described, respectively, in U.S. Pat. Nos. 4,101,445; 4,302,565; and 4,508,842. The melt index of the VLDPE can be in the range of about 0.1 to about 20 grams g/10 minutes; for example, it is in the range of about 0.3 to about 5 g/10 minutes. The portion of the VLDPE attributed to the comonomer(s), other than ethylene, can be in the range of about 1 to about 49 percent by weight based on the weight of the copolymer; for example, it is in the range of about 15 to about 40 percent by weight. A third comonomer can be included, e.g., another alpha-olefin or a diene such as ethylidene norbornene, butadiene, 1,4-hexadiene, or a dicyclopentadiene. Ethylene/propylene copolymers and ethylene/propylene/diene terpolymers are generally referred to as EPRs and the terpolymer is generally referred to as an EPDM. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

The LLDPE can include the VLDPE and MDPE, which are also linear, but, generally, has a density in the range of 0.916 to 0.925 g/cm$^3$. It can be a copolymer of ethylene and one or more alpha-olefins having 3 to 20 carbon atoms, and preferably 3 to 8 carbon atoms. The melt index can be in the range of about 1 to about 20 g/10 minutes, and is preferably in the range of about 3 to about 8 g/10 minutes. The alpha-olefins can be the same as those mentioned above, and the catalysts and processes are also the same subject to variations necessary to obtain the desired densities and melt indices.

As noted above, included in the definition of polyethylene are homopolymers of ethylene made by a conventional high pressure process. The homopolymer may, for example, have a density in the range of 0.910 to 0.930 g/cm$^3$. The homopolymer may also have a melt index ($I_2$) in the range of about 0.5 to about 5 g/10 minutes, and preferably has a melt index in the range of about 0.75 to about 3 g/10 minutes.

In the alternative, substantially linear olefin polymers, such as those described in the U.S. Pat. Nos. 5,278,272 and 5,272,236, incorporated herein by reference, may be used as the polyethylene component.

Such substantially linear olefin polymers may be an ethylene/α-olefin interpolymer:
(a) having a density from about 0.85 g/cm$^3$ to about 0.97 g/cm$^3$; or
(b) having a melt index ($I_2$) from about 0.01 g/10 minutes to about 1000 g/10 minutes; or
(c) having a molecular weight distribution of less than 5; or
(d) wherein substantially linear polymer means that the polymer backbone is either unsubstituted or substituted with up to 3 long branches/1000 carbons, and wherein the long chain branching refers to a chain length of at least 6 carbons above which the chain length cannot be distinguished using $^{13}$C nuclear magnetic spectroscopy; or
(e) being homogenously branched, wherein homogenously branched refers to an ethylene/α-olefin interpolymer, in which the α-olefin comonomer is randomly distributed within a given polymer molecule and substantially all the molecules have the same ethylene-to-comonomer ratio.

Commercial examples of such substantially linear olefin polymers include Engage™ and Affinity™ polymers, both available from The Dow Chemical Company.

In alternative, olefin block copolymers, e.g. ethylene multi-block copolymer, such as those described in the International Publication No. WO2005/090427 and U.S. patent application Ser. No. 11/376,835, incorporated herein by reference, may be used as the polyethylene component.

Such olefin block copolymer may be an ethylene/α-olefin interpolymer:
(a) having a $M_w/M_n$ from about 1.7 to about 3.5, at least one melting point, Tm, in degrees Celsius, and a density, d, in grams/cubic centimeter, wherein the numerical values of Tm and d corresponding to the relationship:

$Tm > -2002.9 + 4538.5(d) - 2422.2(d)^2$; or (b) having a $M_w/M_n$ from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

ΔT > -0.1299(ΔH) + 62.81 for ΔH greater than zero and up to 130 J/g,

ΔT ≥ 48° C. for ΔH greater than 130 J/g, wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$Re > 1481 - 1629(d)$; or (d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G'(25° C.), and a storage modulus at 100° C., G'(100° C.), wherein the ratio of G'(25° C.) to G'(100° C.) being in the range of about 1:1 to about 9:1.

The ethylene/α-olefin interpolymer may be an ethylene/α-olefin interpolymer also:

(a) having a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) having an average block index greater than zero and up to about 1.0 and a molecular weight distribution, $M_w/M_n$, greater than about 1.3.

The crosslinking agent may, for example, be an organic peroxide. The organic peroxide may have a decomposition temperature in the range of 100 to 220° C. for a 10 minute half-life. All individual values and subranges in the range of 100 to 220° C. for a 10 minute half-life are included herein and disclosed herein; for example, the organic peroxide may have a decomposition temperature in the range of 110 to 210° C. for a 10 minute half-life; or in the alternative, the organic peroxide may have a decomposition temperature in the range of 110 to 200° C. for a 10 minute half-life. Exemplary organic peroxides include, but are not limited to, succinic acid peroxide (decomposition temperature of 110° C. for a 10 minute half-life), benzoyl peroxide (decomposition temperature of 110° C. for a 10 minute half-life), t-butyl peroxy-2-ethyl hexanoate (decomposition temperature of 113° C. for a 10 minute half-life), p-chlorobenzoyl peroxide (decomposition temperature of 115° C. for a 10 minute half-life), t-butyl peroxy isobutylate (decomposition temperature of 115° C. for a 10 minute half-life), t-butyl peroxy isopropyl carbonate (decomposition temperature of 135° C. for a 10 minute half-life), t-butyl peroxy laurate (decomposition temperature of 140° C. for a 10 minute half-life), 2,5-dimethyl-2,5-di(benzoyl peroxy)hexane (decomposition temperature of 140° C. for a 10 minute half-life), t-butyl peroxy acetate (decomposition temperature of 140° C. for a 10 minute half-life), di-t-butyl diperoxy phthalate (decomposition temperature of 140° C. for a 10 minute half-life), t-butyl peroxy maleic acid (decomposition temperature of 140° C. for a 10 minute half-life), cyclohexanone peroxide (decomposition temperature of 145° C. for a 10 minute half-life), t-butyl peroxy benzoate (decomposition temperature of 145° C. for a 10 minute half-life), dicumyl peroxide (decomposition temperature of 150° C. for a 10 minute half-life), 2,5-dimethyl-2,5-di(t-butyl-peroxy) hexane (decomposition temperature of 155° C. for a 10 minute half-life), t-butyl cumyl peroxide (decomposition temperature of 155° C. for a 10 minute half-life), t-butyl hydroperoxide (decomposition temperature of 158° C. for a 10 minute half-life), di-t-butyl peroxide (decomposition temperature of 160° C. for a 10 minute half-life), 2,5-dimethyl-2,5-di(t-butyl peroxy)hexane-3 (decomposition temperature of 170° C. for a 10 minute half-life), alpha, alpha'-bis-t-butylperoxy-1,4-diisopropylbenzene (decomposition temperature of 160° C. for a 10 minute half-life), and alpha, alpha'-bis-t-butylperoxy-1,3-diisopropylbenzene. The crosslinkable polyethylene composition may, for example, comprise less than 10 percent by weight of the crosslinking agent, based on the total weight of the crosslinkable polyethylene composition. All individual values and subranges less than 10 weight percent are included herein and disclosed herein; for example, the crosslinkable polyethylene composition may comprise less than 8 percent by weight of the crosslinking agent, based on the weight of the crosslinkable polyethylene composition; or in the alternative, the crosslinkable polyethylene composition may comprise less than 5 percent by weight of the crosslinking agent, based on the weight of the crosslinkable polyethylene composition.

The crosslinking coagent may, for example, be an alkadiene, alkatriene, or alkatetraene compound including at least two terminal carbon-carbon double bonds. Exemplary alkadiene, alkatriene, or alkatetraene compounds including at least two terminal carbon-carbon double bonds include, but are not limited to, 1,9-decadiene, 1,7-octadiene, 1,5-hexadiene, 1,4-pentadiene, 1,3-butadiene, 3,5-hexatriene, 2,3-dimethyle-1,3-butadiene. The crosslinkable polyethylene composition may, for example, comprise less than 5 percent by weight of the crosslinking coagent, based on the total weight of the crosslinkable polyethylene composition. All individual values and subranges less than 5 weight percent are included herein and disclosed herein; for example, the crosslinkable polyethylene composition may comprise less than 3 percent by weight of the crosslinking coagent, based on the weight of the crosslinkable polyethylene composition; or in the alternative, the crosslinkable polyethylene composition may comprise less than 1 percent by weight of the crosslinking agent, based on the weight of the crosslinkable polyethylene composition. For example, the crosslinkable polyethylene composition may comprise from 0.2 to 1 percent by weight of the crosslinking agent, based on the weight of the crosslinkable polyethylene composition. The crosslinking coagent, i.e. alkadienes, alkatrienes, alkatetradienes compounds including at least two terminal carbon-carbon double bonds, is not grafted or incorporated into the polymer backbone thereby mitigating the propensity for scorch. Furthermore, the use of the crosslinking coagent reduces the amount of organic peroxide necessary to achieve the same degree of crosslinking thereby reducing scorch and peroxide decomposition products. Reduction of organic peroxide is highly desirable because high levels of organic peroxide could lead to greater sweat-out.

The crosslinkable polyethylene composition may further include a scorch inhibitor. Such scorch inhibitors include, but are not limited to, 1,1-diphenylethylene (substituted or unsubstituted); 4,4'-thiobis(2-methyl-6-t-butylphenol); 2,2'-thiobis(6-t-butyl-4-methylphenol); 4,4'-thiobis(2-t-butyl-5-methylphenol); 1,4 hydroquinone; 2,4-diphenyl-4-methyl-1-pentene; [1,3,5-tris(4-tert-butyl-3-hydroxy-2,6-dimethylbenzyl)-1,3,5-triazine-2,4,6-(1H,3H,5H)-trione]; 4,4'-thiobis(2-methyl-6-t-butylphenol); 2,2'-thiobis(6-t-butyl-4-methyphenol); blends thereof; or combinations thereof. The crosslinkable polyethylene composition may, for example, comprise less than 3 percent by weight of the scorch inhibitor, based on the total weight of the crosslinkable polyethylene composition. All individual values and subranges less than 3 weight percent are included herein and disclosed herein; for example, the crosslinkable polyethylene composition may comprise less than 1 percent by weight of the scorch inhibitor, based on the weight of the crosslinkable polyethylene composition.

The crosslinkable polyethylene composition may, optionally, further include a cure booster. The optional cure booster may be any one, or a mixture, of a broad selection of boosters.

For example, the optional cure booster may be an ester, ether, or ketone containing at least 2, and preferably 3, unsaturated groups such as a cyanurate, an isocyanurate, a phosphate, an ortho formate, an aliphatic or aromatic ether, or an allyl ester of benzene tricarboxylic acid. The number of carbon atoms in the ester, ether, or ketone may be in the range of 9 to 40 or more, and is preferably 9 to 20. Exemplary esters, ethers, and ketones are essentially non-volatile at storage temperatures, and the unsaturated groups are preferably allyl groups. Specific examples include, but are not limited to, triallyl cyanurate (TAC); triallyl-1,3,5-triazine-2,4,6(1H,3H,5H)-trione also known as triallyl isocyanurate (TAIC); triallyl phosphate; triallyl ortho formate; tetra-allyloxy-ethane; triallyl benzene-1,3,5-tricarboxylate; diallyl pthalate; zinc dimethacrylate; ethoxylated bisphenol A dimethacrylate; methacrylate terminated monomer with average chain length of $C_{14}$ or $C_{15}$; pentaerythritol tetraacrylate; dipentaerythritol pentaaciylate; pentaerythritol triacrylate; dimethylolpropane tetraacrylate; ethoxylated trimethylolpropane triacrylate; trimethylolpropane triacrylate; 2,4,6-triallyl-1,3,5-trione; triallyl trimellitate (TATM); and 3,9-divinyl-2,4,8,10-tetra-oxaspiro[5.5]undecane (DVS). The crosslinkable polyethylene composition may, for example, comprise less than 3 percent by weight of the cure booster, based on the total weight of the crosslinkable polyethylene composition. All individual values and subranges less than 3 weight percent are included herein and disclosed herein; for example, the crosslinkable polyethylene composition may comprise less than 1 percent by weight of the cure booster, based on the weight of the crosslinkable polyethylene composition.

The crosslinkable polyethylene composition may, for example, further include a stable organic free radical as scorch inhibitor and/or crosslinking (cure) booster. Exemplary stable organic free radicals include, but are not limited to, 2,2,6,6-tetramethylpiperidin-1-oxyl (TEMPO) and its derivatives. The crosslinkable polyethylene composition may, for example, comprise less than 5 percent by weight of the stable organic free radical, based on the total weight of the crosslinkable polyethylene composition. All individual values and subranges less than 5 weight percent are included herein and disclosed herein; for example, the crosslinkable polyethylene composition may comprise less than 3 percent by weight of the stable organic free radical, based on the weight of the crosslinkable polyethylene composition; or in the alternative, the crosslinkable polyethylene composition may comprise less than 1 percent by weight of the stable organic free radical, based on the weight of the crosslinkable polyethylene composition. For example, the crosslinkable polyethylene composition may comprise from 0.2 to 1 percent by weight of the stable organic free radical, based on the weight of the crosslinkable polyethylene composition.

The crosslinkable polyethylene composition may further include one or more conventional additives. Such conventional additives include, but are not limited to, antioxidants, ultraviolet absorbers, antistatic agents, pigments, carbon black, dyes, fillers, slip agents, fire retardants, plasticizers, processing aids, lubricants, stabilizers, smoke inhibitors, halogen scavengers, flow aids, lubricants, viscosity control agents, blends thereof, and combinations thereof. The crosslinkable polyethylene composition may comprise from 0.01 to 15 percent by weight the additives, based on the weight of the crosslinkable polyethylene composition. All individual values and subranges from 0.01 to 15 weight percent are included herein and disclosed herein; for example, the crosslinkable polyethylene composition may comprise from 0.01 to 10 percent by weight of additives, based on the weight of the crosslinkable polyethylene composition.

Exemplary antioxidants include, but are not limited to, hindered phenols such as tetrakis[methylene(3,5-di-tert-butyl-4-hydroxyhydro-cinnamate)]methane, bis[(beta-(3,5-di-tert-butyl-4-hydroxybenzyl)-methylcarboxyethyl)]sulphide, and thiodiethylene bis(3,5-di-tert-butyl-4-hydroxy hydrocinnamate); phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate (DSTDP); various siloxanes; and various amines such as polymerized 2,2,4-trimethyl-1,2-dihydroquinoline, 4,4'-bis(alpha,alpha-dimethylbenzyl)diphenylamine, and alkylated diphenylamines.

In production, the crosslinkable polyethylene composition may be processed in various types of extruders, e.g., single or twin screw types. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel may, for example, be in the range of about 15:1 to about 30:1. For the purposes of this specification, it will be understood that the term "extruder" includes, in addition to conventional extruders, the combination of an extruder, crosshead, die, and a heating or cooling zone where a further forming of the material can be accomplished. The heating or cooling follows the die and may, for example, be an oven. For example, in wire coating, where the material is crosslinked after extrusion, the die of the crosshead feeds directly into a heating zone, and this zone can be maintained at a temperature in the range of about 130 to about 260° C., and preferably in the range of about 170 to about 220° C. The extrudate is then crosslinked by exposing it to a temperature greater than the decomposition temperature of the organic peroxide. The peroxide employed is, for example, decomposed through four or more half-lives. The crosslinking can be accomplished in, for example, an oven or a continuous vulcanizable (CV) tube maintained under steam or dry nitrogen environment. With steam CV equipment, a pressure rated vulcanizing tube is mechanically coupled to the extruder crosshead such that the polymer melt exits the crosshead/die assembly into a vulcanizing pipe running perpendicular to the extruder. In a typical CV operation, compositions incorporating peroxides are extrusion fabricated into insulation and cable jacketing at low melt extrusion temperatures to avoid premature crosslinking in the extruder. The fabricated melt shape exits the shaping die into the steam vulcanizing tube where post extrusion peroxide initiated crosslinking occurs. The steam tube is filled with saturated steam which continues to heat the polyolefin melt to the increased temperatures needed for crosslinking. Most of the CV tube is filled with saturated steam to maximize dwell time for crosslinking to occur. The final length before exiting the tube is filled with water to cool the now crosslinked insulation/jacketing. At the end of the CV tube, the insulated wire or cable passes through an end seal incorporating close fitting gaskets, which minimize the cooling water leakage. Steam regulators, water pumps, and valvings maintain equilibrium of the steam and water and the respective fill lengths within the steam CV tube. Alternatively, a hot nitrogen gas CV tube may be used to cure the cable construction.

The method for producing a crosslinkable polyethylene composition according to instant invention includes the steps of: (1) providing a polyethylene component; (2) providing a crosslinking agent, wherein the crosslinking agent is an organic peroxide; (3) providing a crosslinking coagent, wherein the crosslinking coagent is an alkadiene, alkatriene, or alkatetraene compound comprising at least two terminal carbon-carbon double bonds; (4) melt blending the polyethylene component, the crosslinking agent, and the crosslinking agent; and (5) thereby forming the crosslinkable polyethylene composition. The melt blending step occurs at sufficient temperature and pressure to increase the temperature of the blend to a temperature in the range of less than the decomposition temperature of crosslinking weight.

The articles according to instant invention include the crosslinked product of a polyethylene composition; a crosslinking agent, wherein the crosslinking agent is an organic peroxide; and a crosslinking coagent, wherein the crosslinking coagent is an alkadiene, alkatriene, or alkatetraene compound comprising at least two terminal carbon-carbon double bonds. The articles according to instant invention may further include a scorch inhibitor, a cure booster, a stable organic free radical, one or more conventional additives, blends thereof, and combinations thereof.

The method for fabricating articles according to instant invention include the following steps: (1) providing a polyethylene component; (2) providing a crosslinking agent, wherein the crosslinking agent is an organic peroxide; (3) providing a crosslinking coagent, wherein the crosslinking coagent is an alkadiene, alkatriene, or alkatetraene compound comprising at least two terminal carbon-carbon double bonds; (4) melt blending the polyethylene component, the crosslinking agent, and the crosslinking agent; (5) thereby forming a crosslinkable polyethylene composition; (6) subjecting the crosslinkable polyethylene composition to further processing at a temperature in the range of higher than the decomposition temperature of the crosslinking agent; and (7) thereby forming the article. The melt blending step occurs at sufficient temperature and pressure to increase the temperature of the blend to a temperature in the range of less than the decomposition temperature of crosslinking weight.

The articles made according to instant invention may, for example, be used as cable and wire jackets, pipes, foams and footwear.

The patents, patent applications, and publications mentioned in this Specification are incorporated herein by reference.

The present invention may be embodied in other forms without departing from the spirit and the essential attributes thereof, and, accordingly, reference should be made to the appended claims, rather than to the foregoing specification, as indicating the scope of the invention.

Test Methods

Test methods include the following:
Density is measured according to ASTM D 792-03, Method B, in isopropanol.

Melt index ($I_2$) is measured at 190° C. under a load of 2.16 kg according to ASTM D-1238-03.

Melt index ($I_{21}$) is measured at 190° C. under a load of 21.6 kg according to ASTM D-1238-03.

Crosslinking kinetics of the blends is evaluated using a Monsanto Moving Die Rheometer (Model MDR 2000) from Alpha-Technologies, set at 100 cycles per minute and an arc of 0.5 degrees. The torque data correlates to the degree of crosslinking as a function of cure time. The minimum torque ($M_L$) is a measurement of the viscosity of the uncured compound at molten state. This measurement can show the difference in viscosity between two samples. Maximum torque ($M_H$) is a measurement of the shear modulus or stiffness of material after full cross-linking or completion of the test. The difference between the minimum torque and the maximum torque ($M_H$–$M_L$) provides a good idea of degree of crosslinking, at the completion of the test. For this study, the temperature in the MDR chamber is set at temperatures of 140° C. or 182° C. About six grams of sample is placed on the disk (between Mylar films), and the test is started and programmed to stop after certain lengths of time. After the test is stopped, the cross-linked product is removed. The cross-linked products from the MDR experiments at 182° C. is submitted for decalin extractables, which is a method used for measuring the amount of gels in crosslinked polyethylene. This method, ASTM D-2765, Method A, determines the percentage of a sample that is soluble in decalin (190° C. boiling point) over 6 hours. The material which is insoluble, and therefore does not filter through a 120 mesh screen, is the cross-linked portion of the material (and is reported as the gel content).

To simulate melt processing conditions at which pre-mature crosslinking ("scorch") is not desirable, the MDR is run at 140° C. for 120 minutes, and $ts_1$ (the time in minutes for the torque to move above the minimum torque value by 1 lb-in) is obtained, as is $t_{onset}$ (the time in minutes for the torque to start rising from the minimum torque). To simulate vulcanization conditions at which rapid and effective crosslinking is desirable, the apparatus is run at 182° C. for 12 minutes or greater (to ensure complete decomposition of peroxide and crosslinking), and the difference between maximum torque ($M_H$) and the minimum torque ($M_L$) is obtained, i.e., $M_H$–$M_L$, as well as $ts_1$ and $ts_2$ (the time in minutes for the torque to move above the minimum torque value by 2 lb-in).

Weight average molecular weight ($M_w$) and number average molecular weight ($M_n$) are determined according to methods known in the art using conventional GPC, as described herein below.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

DSC Standard Method

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene}=0.431(M_{polystyrene})$.

Polyethylene equivalent molecular weight calculations are performed using Viscotek TriSEC software Version 3.0.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-$d_2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity PlUS™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety).

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Block Index

The ethylene/α-olefin interpolymers are characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF (i.e., fractionation of a polymer by Temperature Rising Elution Fractionation) from 20° C. and 110° C., with an increment of 5° C. (although other temperature increments, such as 1° C., 2° C., 10° C., also can be used):

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction. Similarly, the square root of the second moment about the mean, hereinafter referred to as the second moment weight average block index, can be defined as follows.

$$2^{nd} \text{ moment weight average } BI = \sqrt{\frac{\Sigma(w_i(BI_i - ABI)^2)}{\frac{(N-1)\Sigma w_i}{N}}}$$

where N is defined as the number of fractions with $BI_i$ greater than zero. BI is defined by one of the two following equations (both of which give the same BI value):

$$BI = \frac{1/T_X - 1/T_{XO}}{1/T_A - 1/T_{AB}} \text{ or } BI = -\frac{Ln P_X - Ln P_{XO}}{Ln P_A - Ln P_{AB}}$$

where $T_X$ is the ATREF (i.e., analytical TREF) elution temperature for the ith fraction (preferably expressed in Kelvin), $P_X$ is the ethylene mole fraction for the ith fraction, which can be measured by NMR or IR as described below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the olefin block copolymer. TAB can be calculated from the mole fraction of ethylene (measured by NMR) using the following equation:

$$Ln P_{AB} = \alpha/T_{AB} + \beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$Ln P = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition (i.e., the same comonomer type and content) and the same molecular weight and having an ethylene mole fraction of $P_X$. $T_{XO}$ can be calculated from $Ln\, PX = \alpha/T_{XO} + \beta$ from a measured $P_X$ mole fraction. Conversely, $P_{XO}$ is the ethylene mole fraction for a random copolymer of the same composition (i.e., the same comonomer type and content) and the same molecular weight and having an ATREF temperature of $T_X$, which can be calculated from $Ln\, P_{XO} = \alpha/T_X + \beta$ using a measured value of $T_X$.

Once the block index (BI) for each preparative TREF fraction is obtained, the weight average block index, ABI, for the whole polymer can be calculated.

EXAMPLES

The following examples illustrate the present invention but are not intended to limit the scope of the invention. These examples demonstrate that the instant invention provides for modifications of peroxide based polyolefin cure systems thereby reducing cycle time, reducing scorch, and accelerating degassing. The crosslinking agent used was dicumyl peroxide (DiCup R), a product of Geo Specialty Chemicals. The crosslinking coagent used was 1,9-Decadiene (CAS number 1647-16-1; a product of Acros Organics N.V.). LDPE1 and LDPE2 having resin properties listed in Table II were used as two different grades of polyethylene.

Example 1 was prepared according to the following procedures. The polyethylene component and the crosslinking coagent, as shown in Tables I-III, were introduced into a Barbender™ mixer where they were blended and compounded for 3 minutes at 125° C. thereby forming the polyethylene-crosslinking coagent blend. Subsequently, the crosslinking agent, as shown in Table I-III, was introduced into the Barbender™ mixer where it was blended into the polyethylene-crosslinking coagent blend, and then, they were compounded for an additional 4 minutes at 125° C. thereby forming the crosslinkable polyethylene composition of the instant invention. The crosslinking kinetics of the crosslinkable polyethylene composition were determined using MDR at 140° C. (to simulate mixing/extrusion conditions where scorch is not desirable) and 182° C. (to simulate vulcanization conditions in which rapid and effective crosslinking are desirable), and the results are shown in Table IV and V, respectively.

Example 2 was prepared according to the following procedures. The polyethylene component, the stable organic free radical, and the crosslinking coagent, as shown in Tables I-III, were introduced into a Barbender™ mixer where they were blended and compounded for 3 minutes at 125° C. thereby forming the polyethylene-stable organic free radical-crosslinking coagent blend. Subsequently, the crosslinking agent, as shown in Tables I-III, was introduced into the Barbender™ mixer where it was blended into the polyethylene-stable organic free radical-crosslinking coagent blend, and then, they were compounded for an additional 4 minutes at 125° C. thereby forming the crosslinkable polyethylene composition of the instant invention. The crosslinking kinetics of the crosslinkable polyethylene composition were determined using MDR at 140° C. (to simulate mixing/extrusion conditions where scorch is not desirable) and 182° C. (to simulate vulcanization conditions in which rapid and effective crosslinking are desirable), and the results are shown in Table IV and V, respectively.

Examples 3-5 were prepared according to the following procedures. The polyethylene component and the crosslinking coagent, as shown in Tables I-III, were introduced into a Barbender™ mixer where they were blended and compounded for 3 minutes at 125° C. thereby forming the polyethylene-crosslinking coagent blend. Subsequently, the crosslinking agent, as shown in Tables I-III, was introduced into the Barbender™ mixer where it was blended into the polyethylene-crosslinking coagent blend, and then, they were compounded for an additional 4 minutes at 125° C. thereby forming the crosslinkable composition of the instant invention. The crosslinking kinetics of the crosslinkable polyethylene composition were determined using MDR at 140° C. (to simulate mixing/extrusion conditions where scorch is not desirable) and 182° C. (to simulate vulcanization conditions in which rapid and effective crosslinking are desirable), and the results are shown in Table IV and V, respectively.

Comparative Example 1 was prepared according to the following procedures. The polyethylene component, as shown in Tables I-III, was introduced into a Barbender™ mixer for 3 minutes at 125° C. to melt the polyethylene. Subsequently, the crosslinking agent, as shown in Tables I-III, was introduced into the Barbender™ mixer where it was blended into the polyethylene, and then, they were compounded for an additional 4 minutes at 125° C. thereby forming a comparative crosslinkable polyethylene composition. The crosslinking kinetics of the comparative crosslinkable polyethylene composition were determined using MDR at 140° C. (to simulate mixing/extrusion conditions where scorch is not desirable) and 182° C. (to simulate vulcanization conditions in which rapid and effective crosslinking are desirable), and the results are shown in Table IV and V, respectively.

Comparative Example 2 was prepared according to the following procedures. The polyethylene component and the stable organic free radical, as shown in Tables I-III, were introduced into a Barbender™ mixer where they were blended and compounded for 3 minutes at 125° C. thereby forming the polyethylene-stable organic free radical blend. Subsequently, the crosslinking agent, as shown in Tables I-III, was introduced into the Barbender™ mixer where it was blended into the polyethylene-stable organic free radical blend, and then, they were compounded for an additional 4 minutes at 125° C. thereby forming a comparative crosslinkable polyethylene composition. The crosslinking kinetics of the comparative crosslinkable polyethylene composition were determined using MDR at 140° C. (to simulate mixing/extrusion conditions where scorch is not desirable) and 182° C. (to simulate vulcanization conditions in which rapid and effective crosslinking are desirable), and the results are shown in Table IV and V, respectively.

Comparative Examples 3 was prepared according to the following procedures. The polyethylene component, as shown in Tables I-III, was introduced into a Barbender™ mixer for 3 minutes at 125° C. to melt the polyethylene. Subsequently, the crosslinking agent, as shown in Tables I-III, was introduced into the Barbender™ mixer where it was blended into the polyethylene, and then, they were compounded for an additional 4 minutes at 125° C. thereby forming a comparative crosslinkable composition. The crosslinking kinetics of the comparative crosslinkable polyethylene composition were determined using MDR at 140° C. (to simulate mixing/extrusion conditions where scorch is not desirable) and 180° C. (to simulate vulcanization conditions in which rapid and effective crosslinking are desirable), and the results are shown in Table IV and V, respectively.

At a temperature of 140° C., the addition of 1,9-decadiene either increased scorch time ($ts_1$), or had no effect on $ts_1$. At higher temperature (182° C.), the addition of 1,9-decadiene generally increased the rate of crosslinking (as reflected in both $ts_1$ and $ts_2$), and ultimate degree of crosslinking (as reflected in both gel content and $M_H$–$M_L$). With increasing amounts of 1,9-decadiene, it should also be possible to reduce the amount of peroxide required to attain a fixed degree of crosslinking at 182° C., which in turn would reduce scorch propensity at 140° C. and enable faster "degassing" of peroxide decomposition products. Note that a combination of 1,9-decadiene with 4 hydroxy-2,2,6,6-Tetramethylpiperidin-1-oxyl (4-hydroxy TEMPO) was particularly effective at enhancing crosslinking at 182° C., while "quenching" crosslinking for about 15 minutes at 140° C. (Example 2 versus Comparative 2).

TABLE I

| | Example 1 | Example 2 | Example 3 | Example 4 | Example 5 | Comparative 1 | Comparative 2 | Comparative 3 |
|---|---|---|---|---|---|---|---|---|
| Polyethylene Component | LDPE-1 | LDPE-1 | LDPE-2 | LDPE-2 | LDPE-2 | LDPE-1 | LDPE-1 | LDPE-2 |
| Crosslinking Agent | Dicup R Peroxide | Dicup R Peroxide | Dicup R Peroxide | Dicup R Peroxide | Dicup R Peroxide | Dicup R Peroxide | Dicup R Peroxide | Dicup R Peroxide |
| Crosslinking Coagent | 1,9-decadiene | 1,9-decadiene | 1,9-decadiene | 1,9-decadiene | 1,9-decadiene | — | — | — |
| Stable Organic Free Radical | — | 4 hydroxy-2,2,6,6-Tetramethylpiperidin-1-oxyl | — | — | — | — | 4 hydroxy-2,2,6,6-Tetramethylpiperidin-1-oxyl | — |

TABLE II

| Property | Units | LDPE-1 | LDPE-2 |
|---|---|---|---|
| Melt Index ($I_2$) | g/10 minutes | 2.1 | 2.4 |
| $I_{21}/I_2$ | — | 53 | 52 |
| Density | g/cc | 0.9184 | 0.9200 |

TABLE III

| | Units | Example 1 | Example 2 | Example 3 | Example 4 | Example 5 | Comparative 1 | Comparative 2 | Comparative 3 |
|---|---|---|---|---|---|---|---|---|---|
| LDPE-1 | Weight Percent | 98.05 | 97.8 | — | — | — | 98.3 | 98.05 | — |
| LDPE-2 | Weight Percent | — | — | 98.05 | 97.8 | 97.3 | — | — | 98.3 |
| Dicup R Peroxide | Weight Percent | 1.7 | 1.7 | 1.7 | 1.7 | 1.7 | 1.7 | 1.7 | 1.7 |
| 4 hydroxy-2,2,6,6-Tetramethylpiperidin-1-oxyl | Weight Percent | — | 0.25 | — | — | — | — | 0.25 | — |
| 1,9-decadiene | Weight Percent | 0.25 | 0.25 | 0.25 | 0.5 | 1.00 | — | — | — |
| Total Weight Percent | Weight Percent | 100.00 | 100.00 | 100.00 | 100.00 | 100.00 | 100.00 | 100.00 | 100.00 |

TABLE IV

| MDR: 140° C. | Units | Example 1 | Example 2 | Example 3 | Example 4 | Example 5 | Comparative 1 | Comparative 2 | Comparative 3 |
|---|---|---|---|---|---|---|---|---|---|
| Minimum Torque ($M_L$) | lb-in | 0.26 | 0.26 | 0.24 | 0.26 | 0.30 | 0.28 | 0.26 | 0.30 |
| Maximum Torque ($M_H$) | lb-in | 2.27 | 2.51 | 3.18 | 3.73 | 4.66 | 2.64 | 2.41 | 3.00 |
| $M_H - M_L$ | lb-in | 2.01 | 2.25 | 2.94 | 3.47 | 4.36 | 2.36 | 2.15 | 2.70 |
| Onset of Torque Increase ($t_{onset}$) | Minutes | 2 | 15 | 5 | 5 | 6 | 2 | 15 | 4 |
| $ts_1$ | Minutes | 46.47 | 52.28 | 28.57 | 28.77 | 30.62 | 38.78 | 49.48 | 28.69 |

TABLE V

| MDR: 182° C. | Units | Example 1 | Example 2 | Example 3 | Example 4 | Example 5 | Comparative 1 | Comparative 2 | Comparative 3 |
|---|---|---|---|---|---|---|---|---|---|
| Minimum Torque ($M_L$) | lb-in | 0.16 | 0.13 | 0.18 | 0.17 | 0.17 | 0.17 | 0.14 | 0.18 |
| Maximum Torque ($M_H$) | lb-in | 3.33 | 3.29 | 3.65 | 4.00 | 5.16 | 3.26 | 2.84 | 2.60 |
| $M_H - M_L$ | lb-in | 3.17 | 3.16 | 3.47 | 3.83 | 4.99 | 3.09 | 2.70 | 2.42 |
| tS1 | Minutes | 1.48 | 1.57 | 1.17 | 1.13 | 1.15 | 1.47 | 1.70 | 1.51 |
| tS2 | Minutes | 2.52 | 2.68 | 1.78 | 1.64 | 1.51 | 2.75 | 3.33 | 3.10 |
| Gel Content | Weight % | 84.93 | 83.76 | 86.07 | 84.40 | 90.29 | 63.68 | 67.18 | 77.84 |

We claim:

1. A method for crosslinking a crosslinkable polyethylene composition comprising the steps of:
   providing a polyethylene component;
   providing a crosslinking agent, wherein said crosslinking agent being an organic peroxide;
   providing a crosslinking coagent, wherein said crosslinking coagent being a alkadiene, alkatriene, or alkatetraene compound, wherein said crosslinking coagent comprises at least two terminal carbon-carbon double bonds;
   melt blending said polyethylene component, said crosslinking agent, and said crosslinking agent;
   thereby forming said crosslinkable polyethylene composition;
   subjecting said crosslinkable polyethylene composition to heat thereby raising the temperature of said crosslinkable polyethylene composition to a temperature in the range of greater than the decomposition temperature of said crosslinking agent;
   thereby crosslinking said crosslinkable polyethylene composition and forming a crosslinked polyethylene composition,
   wherein said crosslinked polyethylene composition has a gel content in the range of from 83 to 90 weight percent based on the entire weight of said crosslinked polyethylene composition.

2. An article comprising at least one component formed from the crosslinked product of:
   a polyethylene component;
   a crosslinking agent, wherein said crosslinking agent being an organic peroxide; and
   a crosslinking coagent, wherein said crosslinking coagent being an alkadiene, alkatriene, or alkatetraene compound, wherein said crosslinking coagent comprises at least two terminal carbon-carbon double bonds,
   wherein said crosslinked product has a gel content in the range of from 83 to 90 weight percent based on the entire weight of said crosslinked product.

3. A method for producing an article comprising the steps of:
   providing a polyethylene component;
   providing a crosslinking agent, wherein said crosslinking agent being an organic peroxide;
   providing a crosslinking coagent, wherein said crosslinking coagent being an alkadiene, alkatriene, or alkatetraene compound, wherein said crosslinking coagent comprises at least two terminal carbon-carbon double bonds;

melt blending said polyethylene component, said crosslinking agent, and said crosslinking agent;

thereby forming a crosslinkable polyethylene composition;

shaping said crosslinkable polyethylene composition;

subjecting said shaped crosslinkable polyethylene composition to heat thereby raising the temperature of said shaped crosslinkable polyethylene composition to a temperature in the range of greater than the decomposition temperature of said crosslinking agent;

thereby crosslinking said shaped crosslinkable polyethylene composition and forming a shaped crosslinked polyethylene composition;

thereby forming said article, wherein said shaped crosslinked polyethylene composition has a gel content in the range of from 83 to 90 weight percent based on the entire weight of said shaped crosslinked polyethylene composition.

* * * * *